June 25, 1957 H. L. THOLSTRUP 2,797,090

ADJUSTABLE WIDTH TAPE GUIDES FOR PERFORATED TAPE APPARATUS

Filed July 20, 1955

INVENTOR
HENRY L. THOLSTRUP
BY George Sipkin
Lee J. Hunt...
ATTORNEY 2,797,090
Patented June 25, 1957

2,797,090

ADJUSTABLE WIDTH TAPE GUIDES FOR PERFORATED TAPE APPARATUS

Henry L. Tholstrup, Rochester, N. Y., assignor, by mesne assignments, to the United States of America as represented by the Secretary of the Navy Application July 20, 1955, Serial No. 523,391

2 Claims. (Cl. 271—2.6)

This invention relates to tape guides for apparatus employing perforated tape and, more particularly, to adjustable-width tape guides.

In apparatus employing perforated tape, it is at times desirable to utilize perforated tape punches or readers which are capable of operating with perforated tapes of more than one width.

It is therefore an object of this invention to provide an adjustable-width tape guide which may be used with perforated tapes having more than one width.

It is a more specific object of this invention to provide a tape guide which may be very simply adjusted from a first position to a second position to accommodate perforated tapes having a first width and a second width, respectively.

Other objects and many of the attendant advantages of this invention will be readily appreciated as the same becomes better understood by reference to the following detailed description when considered in connection with the accompanying drawing wherein.

Figure 1:
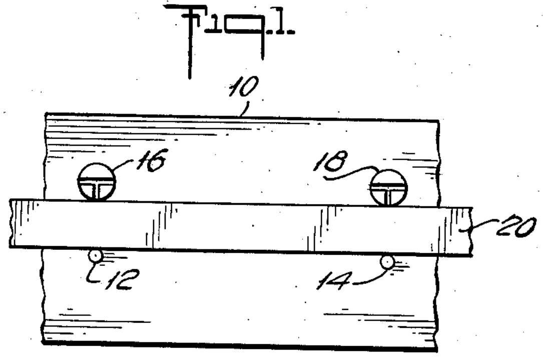
Fig. 1 is a diagrammatic plan view of the adjustable tape guide forming the subject matter of this invention in a first position thereof.

Referring now to Fig. 1, there is shown a portion of perforated tape table 10 to which pins 12, 14, 16 and 18 are secured. Pins 12, 14, 16 and 18 extend perpendicular to the flat face of table 10. Pins 12 and 14 are cylindrically shaped and are fixedly mounted to table 10. Pins 16 and 18 have a substantially semi-circular cross-section and each of them is mounted for rotation about its respective axis. Each of pins 16 and 18 include a screw driver notch on the top surface thereof for turning the respective pin about its axis. Relatively narrow tape 20 is placed as shown between pins 12 and 16 and between pins 14 and 18.

Fig. 1 shows pins 16 and 18 positioned with the straight edge of the semi-circular cross-section thereof positioned parallel and distal to pins 12 and 14. In this position pins 12, 14, 16 and 18 will provide a guide for relatively narrow tape 20. In the perforated-tape apparatus in which this invention is actually employed, the width of relatively narrow tape 20 is $^{11}\!/_{16}$″.

Figure 2:
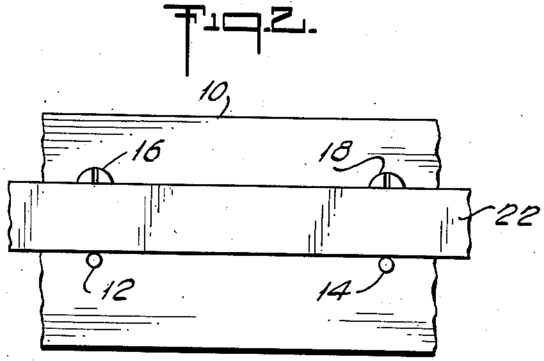
Fig. 2 is a diagrammatic plan view of this adjustable tape guide in the second position thereof.

Referring now to Fig. 2, wherein corresponding elements in Fig. 1 and Fig. 2 are identified by identical reference numbers, pin 16 and pin 18 are shown with the straight edge of the semi-circular cross-sections thereof positioned parallel and proximate to pins 12 and 14. In this position, pins 12, 14, 16 and 18 form a guide for relatively wide tape 22. In the perforated tape apparatus in which this invention is employed, relatively wide tape 22 has a width of $^{7}\!/_{8}$″. It will be seen therefore that the radius of pins 16 and 18 must be equal to the difference between the widths of relatively wide tape 22 of Fig. 2 and relatively narrow tape 20 of Fig. 1, i. e., in the case referred to, the radius of each of pins 16 and 18 is $^{3}\!/_{16}$″.

Figure 3:
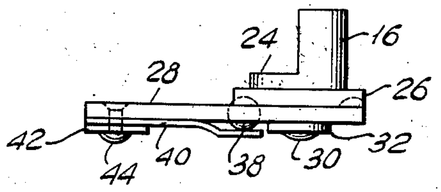
Fig. 3 is a detail elevation view of one of the adjustable tape guides.
Figure 4:
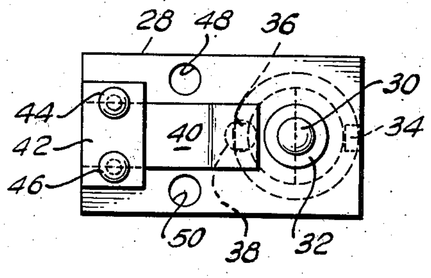
Fig. 4 is a bottom plan view of the adjustable tape guide shown in Fig. 3.

Referring now to Figs. 3 and 4, there is shown in detail pin 16 and its supporting structure. Pin 18 and its supporting structure is identical to that of pin 16 and its supporting structure. Semi-circularly cross-sectional pin 16 rises from portion 24, which has a circular cross-section of a radius equal to that of the radius of pin 16. Portion 24 is integral with base portion 26, which has a radius somewhat greater than the radius of portion 24. The unit composed of pin 16, portion 24 and base portion 26 is secured for rotation about its axis to base plate 28 by rivet 30 and washer 32. The bottom of base portion 26 has two recesses, 34 and 36 respectively, cut therein. Base plate 28 has a hole therein in which is mounted ball 38. Ball 38 is urged upward by leaf spring 40. The end of leaf spring 40 distal from ball 38 is secured to base plate 28 by plate 42 and rivets 44 and 46.

Holes 48 and 50 are used to mount the entire assembly of pin 16 and its supporting structure to table 10, shown in Figs. 1 and 2. The thickness of table 10 is substantially equal to that of portion 24 so that the top of portion 24 will be flush with the top of table 10 when the assembly is mounted. In order to properly align pin 16 perpendicular to table 10, a spacing shim, not shown, having a thickness substantially equal to that of base portion 26, is placed between base plate 28 and table 10 when the assembly is mounted to table 10.

It will be seen that recesses 34 and 36, ball 38 and leaf spring 40 form a detent for holding pin 16 (or in a like manner pin 18), in either the position shown in Fig. 1 or in the position shown in Fig. 2.

Obviously many modifications and variations of the present invention are possible in the light of the above teachings. It is therefore to be understood that within the scope of the appended claims the invention may be practiced otherwise than as specifically described.

I claim:

1. Adjustable guide means adapted for use in apparatus employing tapes of more than one width; said guide means comprising a flat table formed with a circular bore therethrough the axis of the bore being perpendicular to the top of said table, first means secured to said table and extending perpendicularly from the top of said table, second means having a first portion that is circular and of substantially the same diameter as said bore and a second portion of smaller cross sectional area than said circular portion integral with said circular portion and eccentric relative thereto, the surface area of said first portion adjacent the junction of said first and second portions being planar and perpendicular to the axis of said first portion, third means rotatably attached to said second means, said third means being transverse to said second means, detent means engaging said second and third means and defining at least two positions of said second means relative to said third means, said third means being secured to the underside of said table whereby said first means is in registration with the bore and said surface area is coplanar with the top of said table whereby the distance between said first means and said second portion of said second means is adjustable.

2. Adjustable guide means adapted for use in apparatus employing tapes of more than one width, said guide means comprising a flat table formed with a circular bore therethrough, the axis of the bore being perpendicular to the top of said table, a cylindrical pin secured to said table and extending perpendicularly from the top of said table, a member having an intermediate circular portion of substantially the same diameter as the bore and of substantially the same thickness as said table, a portion of larger outside dimensions than said circular portion integral with and extending from one end of said circular portion and a cylindrical segment portion integral with the other end of said circular portion and forming a continuation thereof and having a screwdriver slot formed in its free end, the surface area at the end of said circular portion that is adjacent said cylindrical segment portion being perpendicular to the axis of said circular portion, a flat member rotatably attached to the free end of said portion of larger outside dimensions transversely thereto, detent means engaging said flat member and said portion of larger outside dimensions and defining two positions therebetween, said flat member being secured to the underside of said table with said circular portion in registration with the bore and said cylindrical segment portion extending beyond the top of said table and said surface area coplanar with the top of said table whereby in one position of said cylindrical segment portion the flat surface thereof faces said pin and in the other position of said cylindrical segment portion the arcuate surface thereof faces said pin.

References Cited in the file of this patent

UNITED STATES PATENTS

| | | |
|---|---|---|
| 449,909 | Megill | Apr. 7, 1891 |
| 926,205 | Morgan | June 29, 1909 |
| 1,591,418 | Ferguson | July 6, 1926 |